United States Patent [19]
Niessner et al.

[11] Patent Number: 5,877,242
[45] Date of Patent: Mar. 2, 1999

[54] α TOCOPHEROL-STABILIZED STYRENE/ BUTADIENE BLOCK COPOLYMERS

[75] Inventors: Norbert Niessner, Friedelsheim; Wolfgang Loth, Bad Dürkheim; Konrad Knoll, Ludwigshafen; Norbert Güntherberg, Speyer; Paul Naegele, Otterstadt; Hubert Trauth, Dudenhofen; Jürgen Pohrt, Mannheim, all of Germany

[73] Assignee: BASF Aktiengesellschaft, Ludwigshafen, Germany

[21] Appl. No.: 750,670

[22] PCT Filed: Jun. 8, 1995

[86] PCT No.: PCT/EP95/02212

§ 371 Date: Aug. 14, 1997

§ 102(e) Date: Aug. 14, 1997

[87] PCT Pub. No.: WO95/34600

PCT Pub. Date: Dec. 21, 1995

[30] Foreign Application Priority Data

Jun. 17, 1994 [DE] Germany ............ 44 20 769.7

[51] Int. Cl.⁶ ...................................... C08K 5/34
[52] U.S. Cl. ................. 524/111; 524/128; 524/151
[58] Field of Search ................ 524/111, 128, 524/151

[56] References Cited

U.S. PATENT DOCUMENTS

| 3,639,517 | 2/1972 | Kitchen et al. . |
| 4,489,099 | 12/1984 | Shaheen et al. . |
| 4,584,346 | 4/1986 | Kitchen ........................... 525/250 |
| 5,384,349 | 1/1995 | Trepka et al. . |

FOREIGN PATENT DOCUMENTS

| 263 524 | 4/1988 | European Pat. Off. . |
| 384 472 | 8/1990 | European Pat. Off. . |
| 408 693 | 1/1991 | European Pat. Off. . |
| 25 50 226 | 5/1977 | Germany . |
| 25 50 227 | 5/1977 | Germany . |

OTHER PUBLICATIONS

J.R. Chipault–"Antioxidants for use in Foods" Autoxidation and Antioxidants–vol. 11, W.O. Lunberg, Ed., pp. 486–491 (1962), Interscience Publishers.

R. Gaechter et al., Taschenbuch der Kunststoff–Additive, 2. Auflage, 1893, S 2ff.

R. Gaechter et al., Taschenbuch der Kunststoff–Addivitve 2. Auflage, 1983 S 9ff.

Primary Examiner—Veronica P. Hoke
Attorney, Agent, or Firm—Keil & Weinkauf

[57] ABSTRACT

A molding material comprises styrene/butadiene block copolymers obtainable by anionic polymerization and from 0.01 to 1% by weight, based on the polymer, of α-tocopherol.

3 Claims, 3 Drawing Sheets

αTOCOPHEROL-STABILIZED STYRENE/BUTADIENE BLOCK COPOLYMERS

Many polymeric materials are subject to ageing phenomena which have an undesirable effect during preparation, storage, processing or use and in the widest sense are caused by oxidation. The olefinically unsaturated polymers formed by polymerization of dienes, eg. natural or synthetic rubber, or thermoplastics toughened with such polymers, are particularly sensitive.

As a result of oxidation, the polymers change their outward appearance (loss of transparency, yellowing, cracking, etc) and more or less simultaneously lose their good mechanical properties (impact resistance, elongation at break, tensile strength). In extreme cases, the utility article becomes completely useless.

Among various possible stabilization methods, the addition of antioxidants is generally the usual and most widely used method. Antioxidants are chemical compounds which can inhibit oxidation and the resulting ageing phenomena, typically they themselves undergoing a change. They are generally effective even in small amounts and are advantageously added to the polymer at a very early stage (R. Gächter and H. Müller, Taschenbuch der Kunststoff-Additive, 2nd edition, 1983, page 2, Carl Hanser Verlag Munich).

In addition to the polyolefins, the acrylonitrile/butadiene/styrene copolymers (ABS) and high impact polystyrene (SB) have the highest consumption of antioxidants.

A distinction is made between primary and secondary antioxidants on the basis of their action mechanism. The most important primary antioxidants are the sterically hindered phenols, and also secondary aromatic amines. The latter play only a minor role especially in thermoplastics, owing to their tendency to discolor the products.

Primary antioxidants act as free radical acceptors, while secondary antioxidants (phosphites, thioethers) decompose hydroperoxides. Synergistic mixtures of primary and secondary antioxidants, ie. mixtures in which the components reinforce one another in their action, are frequently used in practice.

The commercially available sterically hindered phenols have a wide range of structures: thiobisphenols, alkylidenebisphenols, alkylphenols, hydroxybenzyl compounds, acylaminophenols and hydroxyphenylpropionates (R. Gächter and H. Müller, Taschenbuch der Kunststoff-Additive, 2nd edition, 1983, page 9 et seq., Carl Hanser Verlag Munich).

For the stabilization of polymers which come into contact with foods, it is necessary to use stabilizers which do not present a health hazard, preferably those which also occur in natural foods.

Vitamin E (α-tocopherol), which is one of the sterically hindered phenols, has already been described as an efficient stabilizer. EP 384 472 describes the use of Vitamin E for polystyrene packaging materials, in conjunction with light stabilizers.

EP 408 693 describes stabilizer mixtures comprising Vitamin E and mono/di/triglycerides for styrene polymers.

Cylindrical and lamellar morphology is found in particular in block copolymers, for example those comprising styrene and butadiene. In contrast to the morphologies derived from a spherical shape (cellular particle, capsular particle, drop particle or filament particle morphologies; in conventional impact-resistant polystyrene or acrylonitrile/butadiene/styrene polymers), the rubber phase in block copolymers is exposed to a substantially higher load during processing. As a result of the direct chemical bonding to the hard phase, stresses in the rubber phase are more poorly eliminated and hence thermal oxidative damage is greatly facilitated.

Such block copolymers are readily obtainable by anionic polymerization and have long been known (cf. for example M. Szwarc: Carbanions, Living Polymers and Electron Transfer Processes, John Wiley Publishers 1968).

These block copolymers include the novel star styrene/butadiene block copolymers predominantly containing styrene, as described, for example, in U.S. Pat. No. 3,639,517 (from 70 to 95% of styrene and from 5 to 30% of butadiene), German Patent 2,550,227 and German Laid-Open Application DOS 2,550,226 (from 60 to 95% of styrene and from 5 to 40% of butadiene).

We have found that, in particular, a mixture of the secondary antioxidant phosphite with Vitamin E has an excellent stabilizer effect in styrene/butadiene block copolymers.

The present invention directly relates to molding materials comprising essentially asymmetric star styrene/butadiene block copolymers obtainable by anionic polymerization and of the general structure

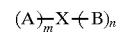

where A is a block copolymer segment comprising at least one polystyrene block having a molecular weight of from 3000 to 230,000 [g/mol] and one polybutadiene block having a molecular weight of from 2000 to 30,000 [g/mol] and B is a block copolymer segment comprising at least one polystyrene block having a molecular weight of from 2000 to 60,000 [g/mol] and one polybutadiene block having a molecular weight from 2000 to 30,000 [g/mol], the total molecular weight of A being from 50,000 to 250,000 [g/mol] and that of B being from 5000 to 75,000 [g/mol], the block transitions being well defined or tapered and the total number of star branches m+n being from 3 to 15, with the proviso that m≦n, and/or a linear styrene/butadiene block copolymer having at least 2 styrene blocks and at least one polybutadiene block, the molecular weights stated above being applicable, and from 0.01 to 1% by weight of α-tocopherol.

In a preferred embodiment, from 0.1 to 2% by weight, based on the polymer, of an organic phosphite are additionally present. This is in particular tris(nonylphenyl) phosphite (TNPP).

Mixtures of such block copolymers with other polymers processable by a thermoplastic method, for example the mixtures with polystyrene described in German Patent 2,610,068, are also effectively protected during processing by the addition of α-tocopherol.

Tocopherol is used in a concentration of from 0.01 to 1, preferably from 0.1 to 0.5, % by weight. It may be mixed with the polymers in any known or conventional manner, for example in pure form directly during processing, by premixing of antioxidant and unstabilized polymer granules, by premixing of antioxidant and polymer in solution and joint devolatilization or in the form of a master batch.

In the preferred embodiment, the organic phosphite is added in an amount of from 0.1 to 2, preferably from 0.2 to 1, % by weight. It is a compound of the general formula (RO)$_3$P, where R may be alkyl, aryl, cycloalkyl or a combination thereof. Examples are tris(nonylphenyl) phosphite, diphenyl decyl phosphite, didecyl phenyl phosphite, phenyl di(2-ethylhexyl) phosphite, methyl diphenyl phosphite, triphenyl phosphite, tris(2,4-dimethylphenyl) phosphite, phenyl dicyclohexyl phosphite, trimethyl phosphite, diisopropyl phenyl phosphite, diethyl phenyl phosphite, di(2-ethylcyclohexyl) n-butyl phosphite and 3-cyclopentylpropyl dihexyl phosphite. Tris(nonylphenyl) phosphite (TNPP) is preferably used.

In a particularly preferred embodiment, the organic phosphite is in turn stabilized with an amine compound, in particular triisopropylamine, in an amount of from 0.1 to 5% by weight, based on 100% by weight of organic phosphite.

Processing is understood as meaning all conventional methods by means of which polymers processable by a thermoplastic method are melted and shaped, for example by means of extruders, injection molding machines, kneaders, etc.

In the case of the styrene/butadiene block copolymers having cylindrical and lamellar morphology, the processing stability can be tested, for example, with the aid of the measuring instrument from Göttfert, Buchen, said instrument being known as Rheograph 2000. Similarly to extrusion or injection molding, the polymer in the form of the melt is forced through a die.

The extrusion pressure in the die is measured at constant melt temperature and constant shear rate. In the course of the measuring time, crosslinking of the rubber phase occurs as a result of thermal oxidative damage to the polymer. Consequently, the melt viscosity and hence also the extrusion pressure increase.

The action of a stabilizer can be detected from the fact that the increase in extrusion pressure is delayed to a greater or lesser extent compared with the unstabilized material. After an initial time of 6 minutes from the beginning of extrusion, the extrusion pressure b is measured during the measuring time of 24 minutes. The pressure difference between the beginning and end of the measuring time, ie. the crosslinking pressure $p_c$, is regarded as a measure of the processing stability.

BRIEF DESCRIPTION OF THE DRAWINGS

The shear curves as a function of time are shown in FIGS. 1 to 3.

EXAMPLES AND COMPARATIVE EXPERIMENT

Figure 1:
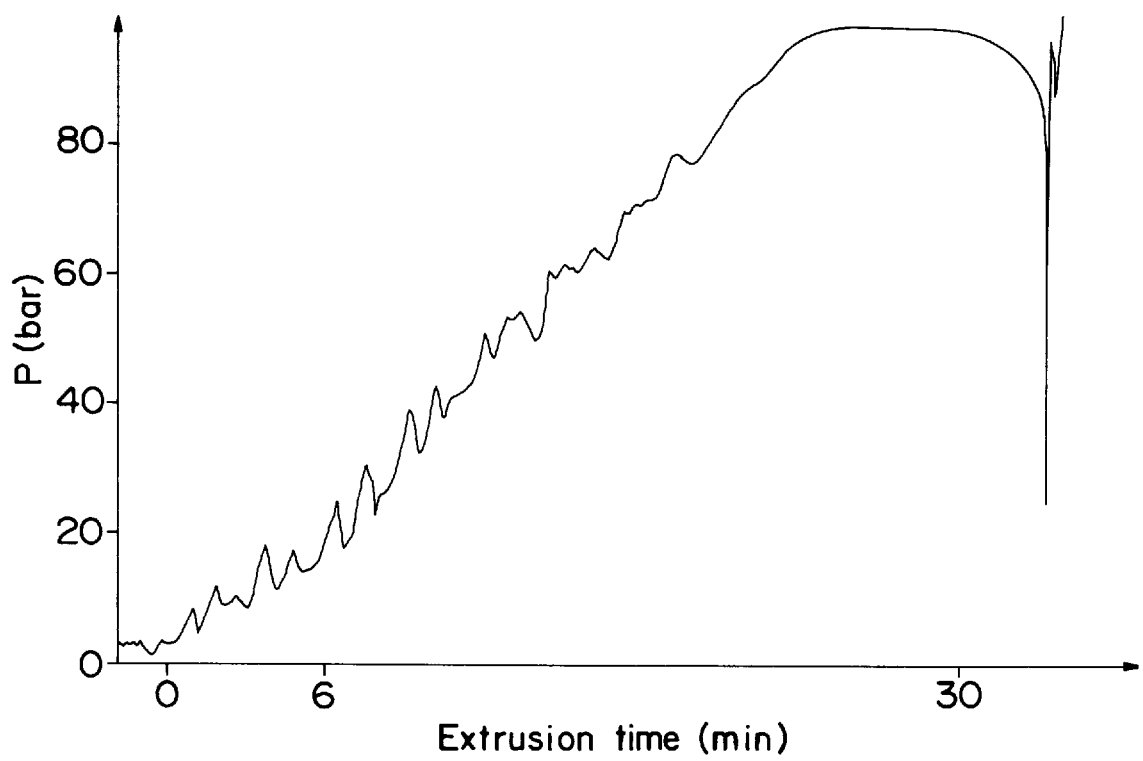
Figure 2:
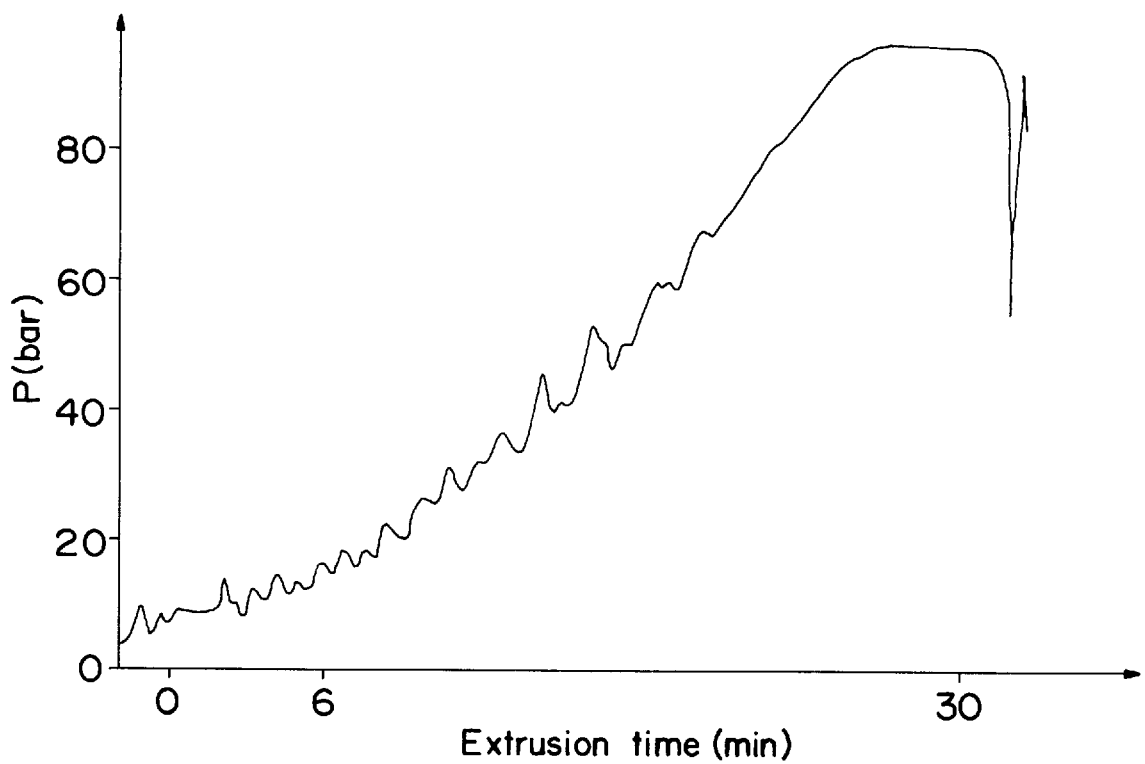
Figure 3:
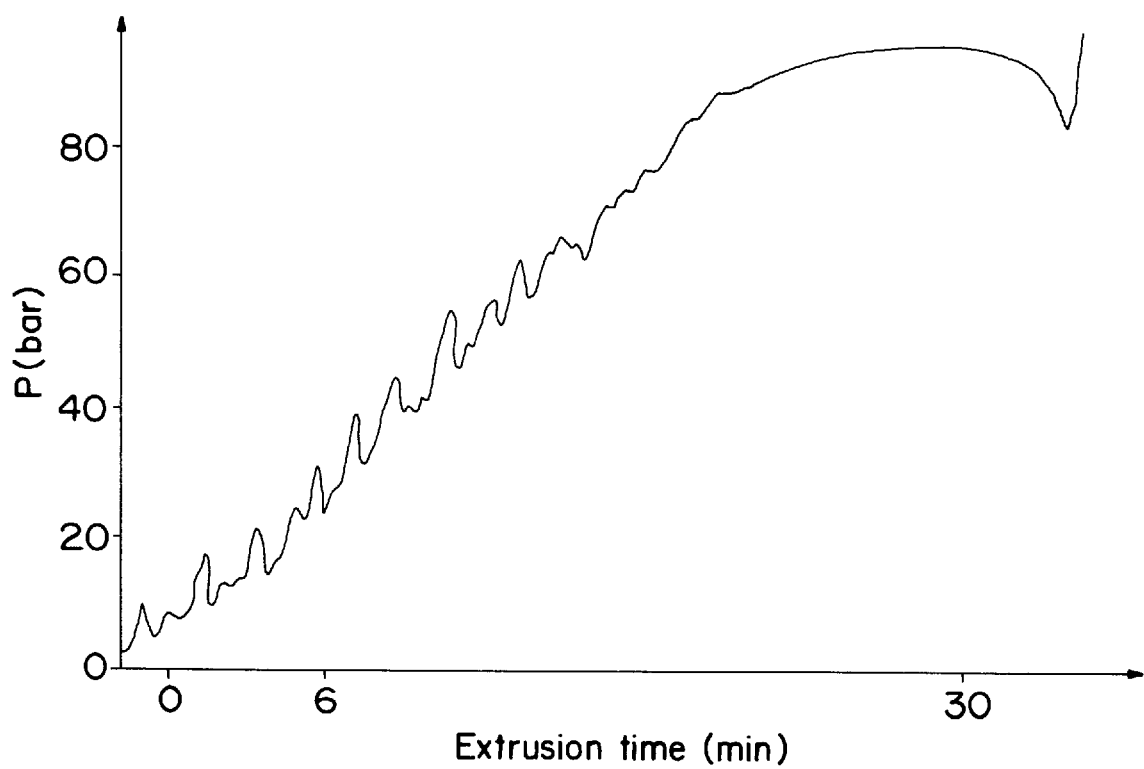

A star styrene/butadiene block copolymer was prepared according to German Patent 2,550,227, Example 1. The viscosity number (VN) was 83.5 ml/g. In contrast to this method, however, the polymer was not precipitated with methanol but, in the form of a solution, was divided into 3 equal portions, stringent exclusion of air being ensured by blanketing with nitrogen. The 3 samples were stabilized according to the list below, by adding antioxidants, and then extruded by gentle devolatilization of the solvent in a type ZSK 25 twin-screw extruder from Werner & Pfleiderer at 200° C., and the extrudate was granulated. 2-Tert-butyl-6-(3-tert-butyl-2-hydroxy-5-methylbenzyl)-4-methylphenyl acrylate is available under the trade name ®Irganox 3052.

EXAMPLE 1

0.4% by weight, based on the polymer, of α-tocopherol, 0.85% by weight, based on the polymer, of TNPP

EXAMPLE 2

0.05% by weight, based on the polymer, of α-tocopherol and 0.55% by weight, based on the polymer, of TNPP

COMPARATIVE EXPERIMENT 0.35% by weight, based on the polymer, of ®Irganox 3052 (Ciba-Geigy) and 0.85% by weight, based on the polymer, of TNPP The samples of the examples were measured using a viscometer from Göttfert (Rheograph 2000) at 290° C. and a shear rate of $1.44 \cdot 10^1 \cdot s^1$.

|  | Example | | Comparative |
|---|---|---|---|
|  | 1 | 2 | experiment |
| Conzentration of the phenolic stabilizer | 0.4 | 0.055 | 0.35 |
| $P_c$ [bar] | 87 | 85 | 82 |

We claim:

1. A molding material comprising styrene/butadiene block copolymers obtainable by anionic polymerization and of the structure $$(A)_m\text{—}X\text{—}(B)_n$$

where A is a block copolymer segment comprising at least one polystyrene block having a molecular weight of from 3000 to 230,000 g/mol and one polybutadiene block having a molecular weight of from 2000 to 30,000 g/mol and B is a block copolymer segment comprising at least one polystyrene block having a molecular weight of from 2000 to 60,000 g/mol and one polybutadiene block having a molecular weight of from 2000 to 30,000 g/mol, the total molecular weight of A being from 50,000 to 250,000 g/mol and that of B being from 5000 to 75,000 g/mol, the block transitions being well defined or tapered and the total number of star branches m+n being from 3 to 15, with the proviso that m≦n, or a linear styrene/butadiene block copolymer having at least 2 polystyrene blocks and at least one polybutadiene block, the molecular weights stated above being applicable, from 0.1 to 2% by weight, based on the polymer, of an organic phosphite in the absence of an effective amount of further sterically hindered phenols and from 0.01 to 1% by weight, based on the polymer of α-tocopherol.

2. A molding material as claimed in claim 1, containing tris(nonylphenyl) phosphite as the organic phosphite.

3. A molding material as defined in claim 1, wherein the organic phosphite is stabilized with an amine compound in an amount of from 0.1 to 5% by weight, based on 100% by weight of organic phosphite.

* * * * *

UNITED STATES PATENT AND TRADEMARK OFFICE
CERTIFICATE OF CORRECTION

PATENT NO.: 5,877,242

DATED: March 2, 1999

INVENTOR(S): NIESSNER et al.

It is certified that error appears in the above-identified patent and that said Letters Patent is hereby corrected as shown below:

On the title page, item [30], "Jun. 17, 1994" should be --Jun. 15, 1994--.

Signed and Sealed this

Twenty-ninth Day of June, 1999

Attest:

Q. TODD DICKINSON

Attesting Officer

Acting Commissioner of Patents and Trademarks